March 14, 1950     E. B. DIXON     2,500,243

DOG FEEDING DEVICE

Filed Oct. 23, 1946

INVENTOR.
Edward B. Dixon
BY
Harry C. Schroeder

Patented Mar. 14, 1950

2,500,243

UNITED STATES PATENT OFFICE 2,500,243

DOG FEEDING DEVICE

Edward B. Dixon, San Pablo, Calif.

Application October 23, 1946, Serial No. 705,153

9 Claims. (Cl. 161—10)

This invention relates to food dispensing devices for animals, and more particularly to automatic devices that do not require constant attention.

The main object of this invention is the provision of a device that will dispense an apportioned amount of food at predetermined intervals.

I attain these objects by the device illustrated in the accompanying drawing, in which.

Figure 1:
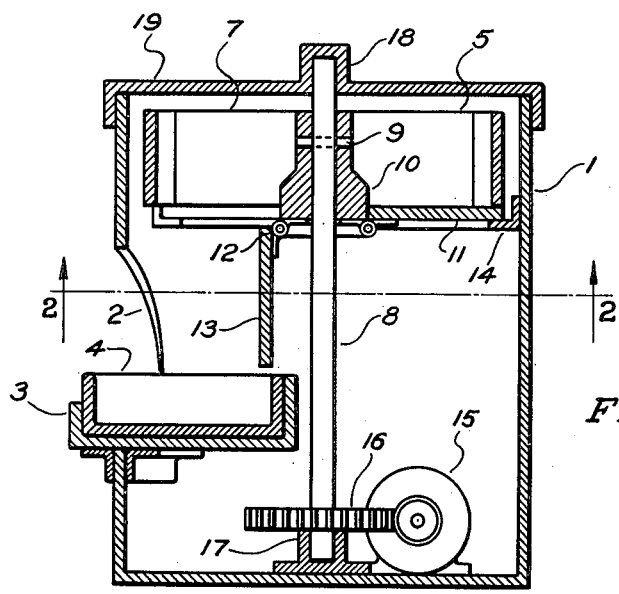
Figure 1 is a sectional side elevation of the device taken on line 1—1 of Figure 3.
Figure 3:
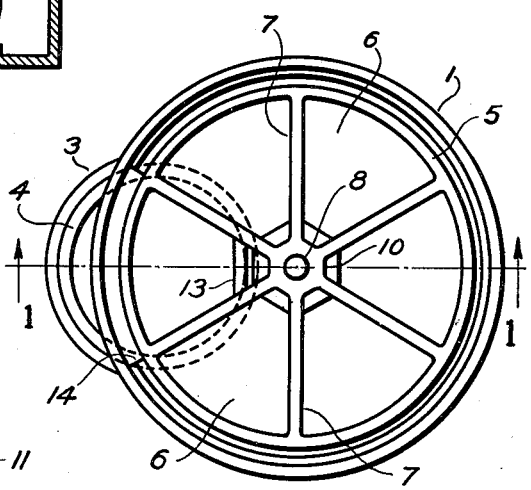
Figure 3 is a top plan view of the device with the cover removed.
Figure 2:
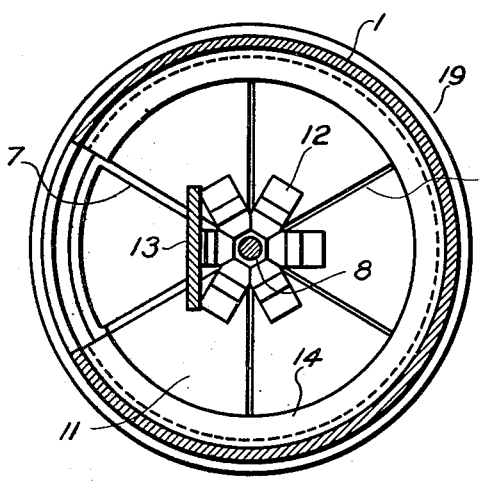
Figure 2 is a sectional plan view of Figure 1 taken on line 2—2.

Referring to the drawing in detail, a cylindrical housing 1, which is cut away at 2, is provided with a tray 3, supporting a feeding dish 4.

Rotatably mounted in the upper portion of the housing 1, is a cylindrical receptacle 5, divided into a number of compartments 6, by partitions 7, which are radial to a central boss 10. A vertical shaft 8, passes through the boss 10, and is fixedly attached thereto by pin 9. Shaft 8, is seated at its lower end in a footstep bearing 17, secured to the bottom of the housing 1, and at its upper end is supported by bearing 18, forming part of the cover 19.

The entire rotatable assembly is operated by a clock mechanism or synchronous electric motor 15, through the medium of a worm gear 16, mounted on the shaft 8.

Each compartment 6, of the rotating receptacle is equipped with a hinged bottom member 11, which, when in the horizontal position, completely covers its respective opening, but when unsupported, pivots on hinge 12, attached to boss 10, and falls by gravity into a hanging position as at 13.

Attached to the inside wall of the housing 1, is a ring member 14, adapted to extend around the periphery of the housing as shown and support all of the members 11, with the exception of the one directly above the feeding tray 4.

In operation, food is placed in each of the individual compartments, and by means of the timed mechanism, at predetermined intervals, a hinged member is brought into register with the opening in the supporting angle. The bottom of the compartment is then free to swing downwardly, and its contents are deposited into the feeding tray.

From the foregoing, it will be apparent that I have provided a device which can be used to feed a dog or other pet for several successive days during the owner's absence.

While I have disclosed a preferred embodiment of my invention it will be understood that modifications may be made within the spirit and scope of the appended claims.

I claim:

1. In a food dispensing device, a rotatable receptacle, a circumferential series of compartments formed in said receptacle, a separate closure on the bottom of each compartment rotating with the receptacle and normally preventing the dropping of food from the compartment, and a device for holding said closures in closed position, but releasing each closure at a predetermined circumferential position for dropping the food from the compartment at said position, and means to rotate said receptacle for moving said compartments in series to said releasing position at predetermined intervals.

2. A food dispensing device comprising a main housing, a rotating receptacle in said housing divided into a plurality of compartments, pivotally mounted bottoms for said compartments rotating with said receptacle, and a supporting member adapted to engage one less than the complete number of said bottoms to hold said bottoms closed, and a feeding dish under the unengaged bottom.

3. In a food dispensing device, a rotatable receptacle, a circumferential series of compartments formed in said receptacle, a separate closure on the bottom of each compartment rotating with the receptacle and normally preventing the dropping of food from the compartment, and a device for holding said closures in closed position, but releasing each closure at a predetermined circumferential position for dropping the food from the compartment at said position, and means to rotate said receptacle for moving said compartments in series to said releasing position at predetermined intervals, and a feeding dish spaced under said closure at said predetermined position and being accessible for feeding.

4. A food dispensing member comprising a main housing, a rotatable receptacle mounted within said housing, and being divided into a plurality of compartments, a hinged bottom attached to each of the said compartments and means to hold said bottoms closed during rotation of said receptacle and releasing successively each of said hinged bottoms at a predetermined position.

5. In a food dispensing device a housing, a plurality of food carrying compartments supported near the top of the housing and being rotatable together about a common axis, a feeding member accessible at one side of said housing spaced below said compartments, means in the housing to rotate said compartments to move said compartments successively into registry with said feeding member at predetermined intervals, a swinging bottom carried on each compartment, a device on the housing to hold said swinging bottoms closed but to release said bottoms successively in said registering position for dropping the food into said feeding member.

6. In a food dispensing device a housing, a plurality of food carrying compartments supported near the top of the housing and being rotatable together about a common axis, a feeding member accessible at one side of said housing spaced below said compartments, means in the housing to rotate said compartments to move said compartments successively into registry with said feeding member at predetermined intervals, a swinging bottom carried on each compartment, a ring member in said housing engaging said bottoms and holding them closed, said ring member having a gap above said feeding member for releasing the bottom of the compartment in registry with said feeding member.

7. In a food dispensing device a housing, a plurality of food carrying compartments supported near the top of the housing and being rotatable together about a common axis, a feeding member accessible at one side of said housing spaced below said compartments, means in the housing to rotate said compartments to move said compartments successively into registry with said feeding member at predetermined intervals, a swinging bottom carried on each compartment, a device on the housing to hold said swinging bottoms successively in said registering position for dropping the food into said feeding member, and a removable cover on the housing covering the tops of said compartments.

8. In a food dispensing device, a housing having a feeding opening on one side thereof, a feeding dish at said opening accessible for feeding, a plurality of food carrying compartments supported in the housing for unitary rotation about a common axis and spaced above said dish, a swinging bottom on each compartment pivoted at its edge nearest to said axis, a ring member in the housing engaging the outer ends of the swinging bottoms to hold them in closed position, said ring member having a gap in registry with said dish to release the bottom of the compartment above said dish and allow the dropping of the food from said compartment into said dish, and a mechanism in said housing to rotate said compartments for successively aligning said compartments with said dish at predetermined intervals.

9. In a food dispensing device, a housing having a feeding opening on one side thereof, a feeding dish at said opening accessible for feeding, a plurality of food carrying compartments supported in the housing for unitary rotation about a common axis and spaced above said dish, a swinging bottom on each compartment pivoted at its edge nearest to said axis, a ring member in the housing engaging the outer ends of the swinging bottoms to hold them in closed position, said ring member having a gap in registry with said dish to release the bottom of the compartment above said dish and allow the dropping of the food from said compartment into said dish, and a mechanism in said housing to rotate said compartments for successively aligning said compartments with said dish at predetermined intervals, and a removable cover on the housing, the tops of said compartments being open.

EDWARD B. DIXON.

REFERENCES CITED

The following references are of record in the file of this patent:

UNITED STATES PATENTS

| Number | Name | Date |
|---|---|---|
| 2,307,166 | Rainer | Jan. 5, 1943 |

FOREIGN PATENTS

| Number | Country | Date |
|---|---|---|
| 198,188 | Germany | May 9, 1908 |